UNITED STATES PATENT OFFICE.

JOHN D. PENNOCK, OF SYRACUSE, NEW YORK, ASSIGNOR TO THE SOLVAY PROCESS COMPANY, A CORPORATION OF NEW YORK.

PROCESS OF MANUFACTURING A FILLING MATERIAL.

No. 802,657. Specification of Letters Patent. Patented Oct. 24, 1905.

Application filed June 8, 1904. Serial No. 211,640.

*To all whom it may concern:*

Be it known that I, JOHN D. PENNOCK, a citizen of the United States, residing at Syracuse, in the county of Onondaga and State of New York, have invented a new and useful Process of Manufacturing a Filling Material, of which the following is a specification.

My invention relates to improvements in the process of producing a filling material.

The object of my invention is to manufacture a filling material free from impurities and by means which shall not render such production prohibitive by reason of its cost.

Recent industries utilize in very considerable quantities materials which are naturally inert from the chemical point of view, but which by reason of their physical qualities of color, fineness, homogeneity, &c., are useful as vehicles or filling materials in the manufacture of rubber, paint, paper, plaster, &c.—such, for example, as sulfate of lime, sulfate of baryta, kaolin, chalk, &c.

The object of my invention is the artificial production of such materials starting from waste products and so treating them by chemical reagents as to obtain a filling material at prices which permit competition with the natural products. It is very evident that a simple grinding of limestone or natural chalk would not accomplish the same end, because these materials, even though selected, contain quantities of impurities which interfere with the end to be attained and only produce from the raw material products of inferior quality both as to color and composition. My process, on the contrary, consists in causing these materials to enter into a chemical combination which permits me to deal only with a compound of pure calcium, then by means of an appropriate precipitation to withdraw them from such combination. In this manner is obtained a substance which is perfectly white and of extreme lightness, with a possibility of varying the grain according to the conditions of the precipitation and according to the uses for which the product is intended.

My process relates especially to the treatment of crude precipitated chalk from the waste muds arising in the manufacture of caustic soda by the lime process for the preparation of a filler. The product resulting from causticizing sodium carbonate by lime contains, in addition to sand and other physical impurities derived from the lime, a certain proportion of alkaline compounds which render it unsuited for use as a filling material. In addition to calcium carbonate this product may contain three to eight per cent. of calcium hydrate and a variable quantity of sodium compounds, which are tenaciously held and which cannot be extracted by simple washing. I prefer to treat this product as follows: I float and wash the lime waste to remove as far as possible the carbonate of soda and to separate sand and other impurities. I conduct the liquid carrying the calcium carbonate and its associated alkaline impurities in suspension to a suitable reaction-tower and treat it therein with carbon dioxid, preferably at a temperature of about 70° centigrade, whereby the hydrated calcium is converted into carbonate. The resulting carbonated product is filter-pressed to separate it from water and dried with hot air, preferably at a temperature of about 70° to 80° centigrade.

By varying the temperature, the concentration, the rapidity of mixture, agitation, or introducing foreign salts it is possible to largely influence the physical character of the precipitates, and thus several degrees of fineness may be obtained.

What I claim is—

1. The process of producing a filling material from the waste muds arising in the manufacture of caustic soda by the lime process, or from other similar material, which consists in floating and washing the lime waste to remove soluble carbonate of soda and to separate sand and other impurities from the lime used for causticizing, then passing carbonic-acid gas through the suspended product at a suitable temperature, then separating the carbonated product from water.

2. The process of producing a filling material from the waste muds arising in the manufacture of caustic soda by the lime process, or from other similar material, which consists in floating and washing the lime waste to remove soluble carbonate of soda and to separate sand and other impurities from the lime used for causticizing, then passing carbonic-acid gas through the suspended product at a suitable temperature, then separating the carbonated product from water and drying said separated product at a suitable temperature with hot air.

JOHN D. PENNOCK.

Witnesses:
H. A. FLINT,
E. J. DAVIS.